United States Patent [19]

Williams

[11] 3,937,078
[45] Feb. 10, 1976

[54] SENSING APPARATUS FOR INCLINOMETERS

[75] Inventor: Gerald J. Williams, Miami, Fla.

[73] Assignee: General Oceanus, Inc., Miami, Fla.

[22] Filed: Apr. 10, 1974

[21] Appl. No.: 459,658

[52] U.S. Cl. .................. 73/189; 33/352; 33/363 Q; 250/231 R; 340/196
[51] Int. Cl.² ........................................... G01P 5/06
[58] Field of Search ....... 33/310, 313, 352, 363 RQ, 33/366; 73/189; 340/196, 189 M, 152 T, 340/201 P, 203; 250/231

[56] References Cited
UNITED STATES PATENTS

| | | | |
|---|---|---|---|
| 2,375,227 | 5/1945 | Hillman | 73/189 |
| 3,071,976 | 1/1963 | Kunz | 250/231 R |
| 3,084,443 | 4/1963 | Kaatz et al. | 33/352 |
| 3,310,736 | 3/1967 | Bayly et al. | 340/189 M |
| 3,372,585 | 3/1968 | Niskin | 73/170 A |
| 3,596,523 | 8/1971 | Clark | 74/5.6 A |
| 3,706,225 | 12/1972 | Stimson | 73/189 |
| 3,836,842 | 9/1974 | Zimmermann et al. | 340/282 |

Primary Examiner—Richard E. Aegerter
Assistant Examiner—John W. Shepperd
Attorney, Agent, or Firm—Salvatore G. Militana

[57] ABSTRACT

An apparatus for sensing the orientation of an inclinometer in both direction and magnitude for determining the velocity and direction of currents in a body of water having a magnetic north seeking sphere buoyantly supported in a housing. Implanted on the sphere is a plurality of tuned circuits of different resonant frequencies set at right angles to each other and a sense-drive winding or coil mounted about the housing. Upon applying a series of pulses of voltage to the sense-drive coil, the tuned circuits will oscillate with decaying amplitude at their resonant frequencies in the intervals between the pulses of voltage. The mean voltage across each of the tuned circuits is a measure of the amount and direction of tilt of the housing caused by the currents. The sense-drive coil senses these voltages across the tuned circuits and between the induced pulses of voltages, will transmit them to conventional recording equipment whereby a continuous determination of the currents velocity and direction are obtained.

4 Claims, 15 Drawing Figures

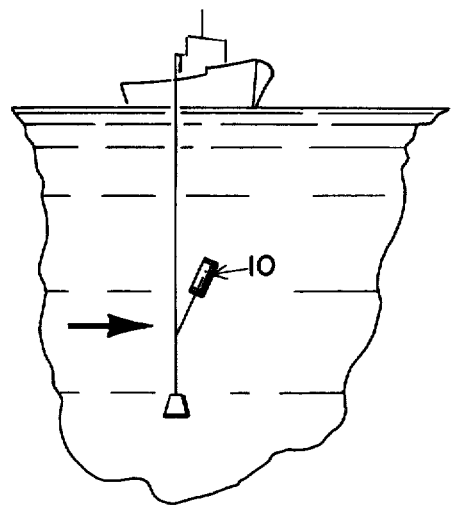
FIG. 1
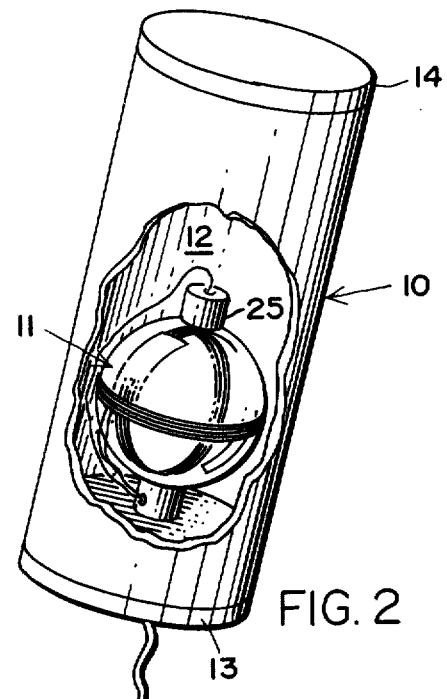
FIG. 2
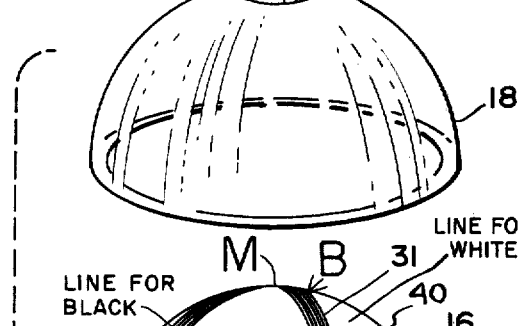
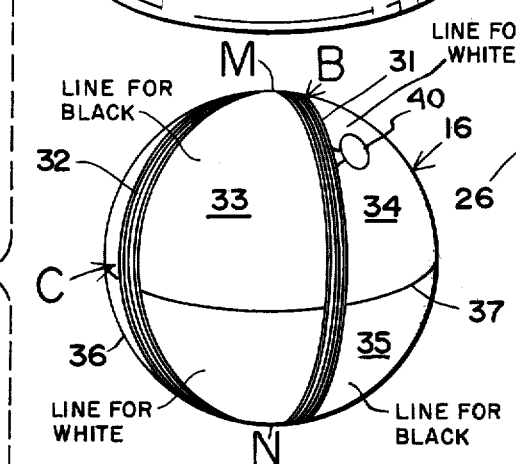
FIG. 3
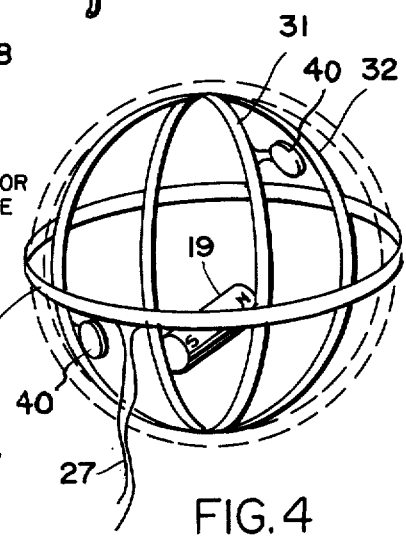
FIG. 4

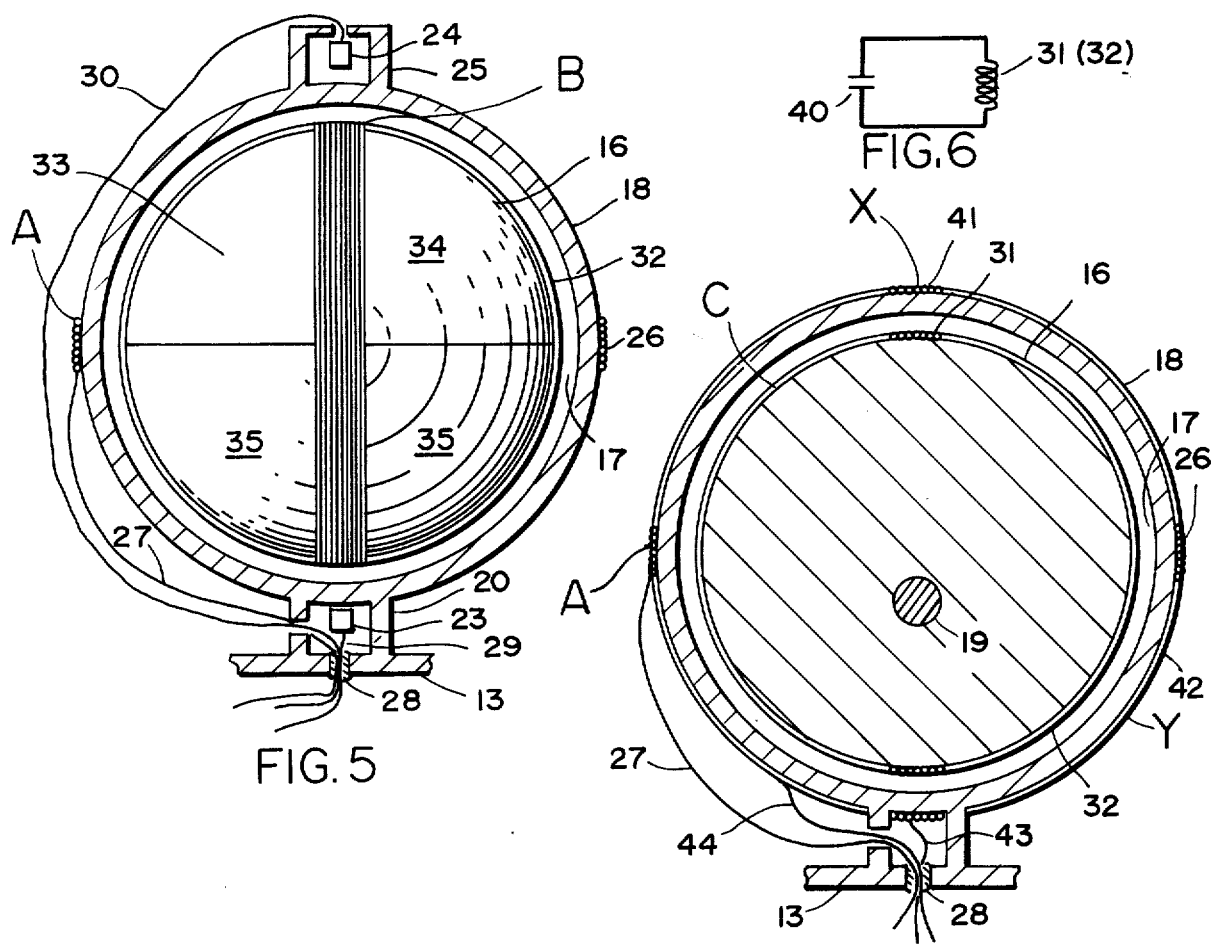
FIG. 5
FIG. 6
FIG. 15
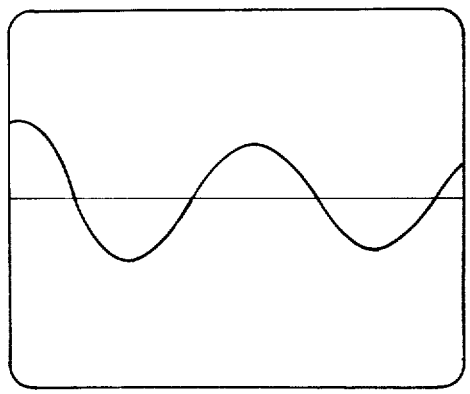
FIG. 7 TILT TO NORTH
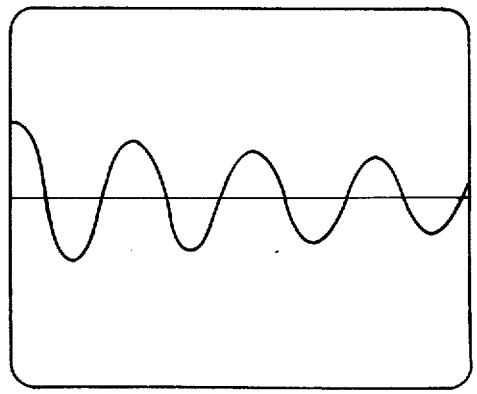
FIG. 8 TILT TO WEST

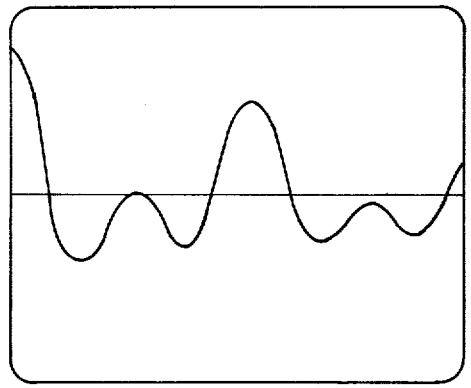
FIG. 9 TILT TO NORTH-WEST
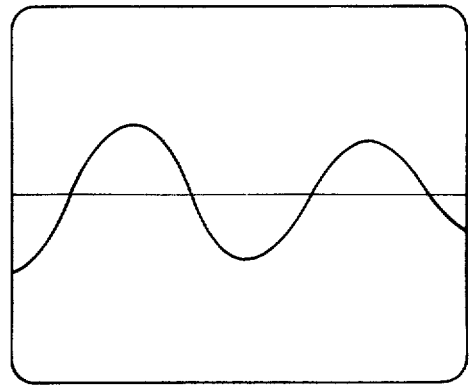
FIG. 10 TILT TO SOUTH
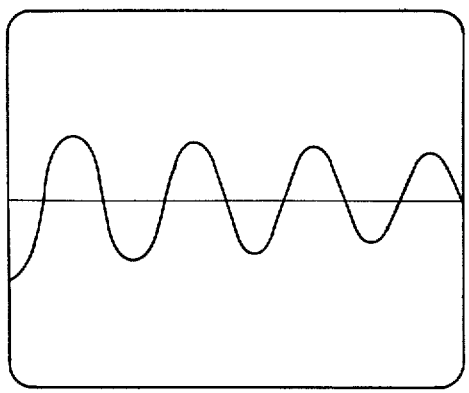
FIG. 11 TILT TO EAST
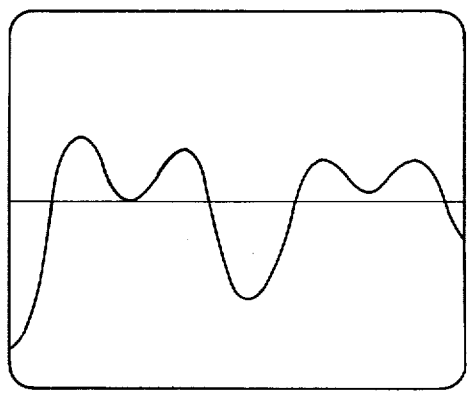
FIG. 12 TILT TO SOUTH-EAST
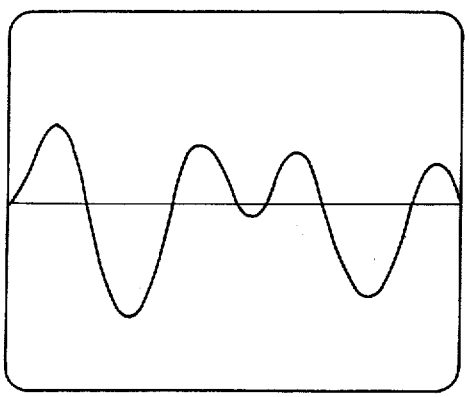
FIG. 13 TILT TO NORTH-EAST
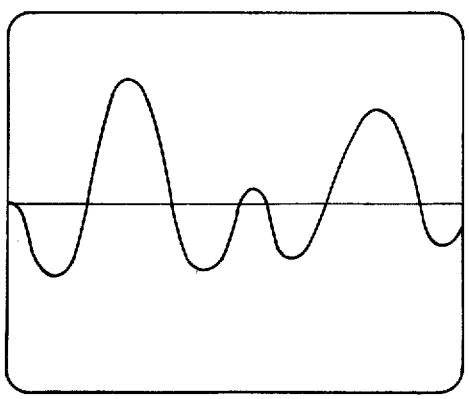
FIG. 14 TILT TO SOUTH-WEST

SENSING APPARATUS FOR INCLINOMETERS

BACKGROUND OF THE INVENTION

1. Field Of The Invention

This invention relates to devices for measuring current velocity and direction in a body of water and is more particularly directed to such an apparatus that utilizes the direction and magnitude of tilt effected by the current thereon for determining current velocity and direction of flow.

2. Description Of The Prior Art

In recent years, the inclinometer or tilt meter has replaced the rotor mounted logs for determing subsurface current velocities and directions in a body of water. The inclinometers are more accurate in obtaining the information desired and not subject to fouling by debris, and other matter in the water as are the rotor mounted logs. From the inclinometers the extent of tilt effected by the current is obtained in both the North-South direction and the East-West direction, which information is sufficient to determine, by the application of the mathematics of vectors, the actual direction of the flow of the current and its velocity. The problem with the use of inclinometers or tilt meters has been in the procuring of this information from these devices at the same time as the instruments are affected by the currents. At present, the inclinometers have to be lifted from their position in the body of water in order to read the recordings thereof. As shown by my U.S. Pat. No. 3,372,585, the inclinometer is provided with a soluble member which upon its dissolution by the water after a predetermined period of time, the mechanism of the inclinometer is locked in position and the reading then recorded becomes fixed so that upon withdrawing the tilt meter from the water, the device remains inoperative and the reading unchanged. However, the device must be removed from the body of water to be read so that the information may be recorded as incurred thereon by the action of the current. In those inclinometers wherein a number of such readings of current action is desired over a period of time, the devices are provided with photographic equipment for taking pictures of the readings on the inclinometer along with a clock for indicating time. These devices, likewise, must be removed from the body of water in order to obtain the current information. The present invention avoids the disadvantage of having to remove the inclinometer from the body of water by transmitting the readings of the device simultaneously as they are effected by the currents as to their forces and directions. The recipient of this information can be ashore or in a boat and if desired the information can be recorded and stored on a magnetic tape for use in a computer.

SUMMARY OF THE INVENTION

Therefore, a principal object of the present invention is to provide an apparatus for sensing and simultaneously transmitting the effect of the orientation of an inclinometer or tilt meter by the forces of a current in determining the velocity and direction of flow of currents in a body of water without removal of the device from the water.

Another object of the present invention is to provide a sensing apparatus for inclinometers or tilt meters on which electrical circuits are mounted so that upon the orientation of the inclinometer by the action of a current acting thereon, the electrical circuits are appropriately affected and transmit information obtained thereby determining the current velocity and direction without the necessity of removing the inclinometer from the body of water.

A further object of the present invention is to provide a sensing and tranmitting apparatus for inclinometers or tilt meters in which a plurality of circuits of different resonant frequencies are mounted on a magnetically oriented sphere that is constantly aligned in a vertical position and with the magnetic north pole in a body of water and a sense-drive coil that is mounted on the housing tilted by the forces of the current in both magnitude and direction, which information is received and recorded without the necessity of removing the inclinometer from the body of water.

A still further object of the present invention is to provide an apparatus for inclinometers or tilt meters for sensing and recording on magnetic tape, the magnitude and direction of tilt simultaneously with the happening, which information is a measure of the current forces and direction without the necessity of removing the inclinometer or tilt meter from the body of water.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In the Drawings:

FIG. 1 is a perspective view of a ship in a body of water using my inclinometer for determining the current force and direction.

FIG. 2 is an enlarged perspective view of the combined housing and inclinometer with the housing partially broken away.

FIG. 3 is an exploded view of the inclinometer.

FIG. 4 is a perspective view showing the inner sphere in dotted lines and the tuned circuits in solid lines.

FIG. 5 is a cross sectional view of the inclinometer.

FIG. 6 is a diagram of the tuned circuit.

FIGS. 7-14 inclusive are plan views of the various signal wave forms.

FIG. 15 is a view similar to FIG. 5 showing an alternate construction of my inclinometer.

DETAILED DESCRIPTION OF THE PREFERRED EMBODIMENTS

Referring to the drawings wherein like numerals are used to designate similar parts throughout the several views, the numeral 10 refers to a conventional hollow cylindrical housing for containing a tilt member 11 in the chamber 12 of the housing 10 whose ends are sealed by covers 13 and 14. The cover 13 is removable being secured to the end of the housing 10 by means of fasteners (not shown).

Mounted on the removable cover 13 and extending upwardly in the chamber 12 of the housing 10 is the tilt meter or inclinometer 11 consisting of a sphere 16 neutrally buoyant in a fluid 17 contained in a larger hollow spherical housing 18. The fluid 17 compeletely enshrouds the sphere 16 so that there is a layer of fluid interposed between the two spheres thereby reducing friction therebetween to an absolute minimum. The spherical housing 18 is secured to the cover plate 13 by a base member 20 cemented to the cylindrical housing at one end and to the cover plate 13 at the other end. The base member 20 is hollow to receive a conventional photo sensing device 23 in vertical alignment with a second photosensing device 24 mounted in a bracket 25 and positioned above the spherical housing 18.

Wound about the outer sphere 18 in a horizontal plane passing through the center of the sphere 18 are coils of wire 26 forming a drive-sense circuit -A-. The coils 26 are connected by a wire 27 that extends through a watertight opening 28 along with wires 29 and 30 connected to the photo electric sensing devices 23 and 24. The wires 27, 29 and 30 extend to voltmeters, oscilloscope for visual reading or other suitable electronic processing circuitry capable of producing signals for recording as on magnetic tape.

The sphere 16 is provided with a pair of tuned circuits -B- and -C- of different frequencies, with each of these circuits consisting of coils of wire 31 and 32 respectively extending about the surface of the sphere 16. The coils 31 and 32 lie in great circles about the sphere 16 at right angles to each other. A bar magnet 19 is mounted horizontally below the center of the sphere 16 with its ends secured to the inner surface of the sphere 16. The bar magnet 19 lies in coplanar relation with the coil 31 and is at right angles to a line passing through the position of the crossing of the coils 31 and 32 at the zenith -M- and nadir -N-. As a result of this arrangement of parts, the sphere 16 is compelled to always be vertically disposed and oriented to the magnetic north pole of the earth, notwithstanding the effects of current velocity and force subjected on the housing 10. The drive sense-coil 26 of the circuit -A- lies in a great circle about the spherical housing 18 in a plane parallel with the plane of the magnet 19 when the instrument is in the upright position. Each of the inductance coils 31 and 32 are connected in series with a capacitor 40, so that each of the tuned circuits 31 and 32 will respond to a current flowing in the drive-sense coil 26.

The surface of the sphere 16 is divided into four quadrants 33, 34, 35 and 36; quadrants 33 and 35 being painted black while quadrants 34 and 36 are painted white. These quadrants may be black, white, or otherwise optically contrasting. The black quadrant 33 extends about the sphere 16, bounded by the coil 31 on two sides and at its third side by the great circle 37 that is perpendicular to the axis of the sphere 16 passing through the zenith -M- and nadir -N-. The white quadrant 34 is opposite the black quadrant 33 bordered by the coil 31 on two sides and the great circle 37 on its third side. The black quadrant 35 and white quadrant 36 are below the great circle 37 and positioned opposite each other with the coil 32 bordering on the two sides of the quadrants 35 and 36 and the great circle 37 on their third side.

Upon applying a series of impulses of electric current at regular intervals of time through the drive-sense coil 26 there will be induced in each of the tuned circuits -B- and -C- decaying oscillation of voltage which, in the intervals between the applied impulses of current, will induce back into the sensing circuit a signal whose voltage is a measure of the amount of tilt of the spherical housing 18. Since the tuned circuits are of different frequencies, two signals will be induced in the sensing circuit to indicate tilt in two directions, namely North-South and East-West and as explained in detail hereinafter, this information will be sufficient to indicate direction and magnitude of tilt which is a measure of direction of flow and the velocity of the current effecting that particular tilt of the inclinometer.

When the combined cylindrical housing 10 and inclinometer 11 are placed in a body of water in which there is no current present, the housing 10 and the sphere 16 and spherical housing 18 will become vertically disposed with the inner sphere 16 oriented toward the magnetic north pole. Now when pulses of electric current is applied to the coil 26 the drive-sense circuit -A- by way of the wire 27 a magnetic field is created about the coil 26. There will be no current induced in the tuned circuit -B- because the coil 31 of the tuned circuit -B- is at exactly right angle to the drive-sensor coil 26 and thereby inducing no voltage therein. Therefore, no signal will be returned to the conventional signal receiving equipment such as the oscilloscope. However if there is a current flow in the body of water as shown in FIG. 1, the housing 10 and inclinometer 11 will tilt in the direction of the flow of current so that now the spherical housing 18 will tilt with relation to the sphere 16 which will always be found exactly vertically disposed and oriented to the magnetic north pole. Now the periodic electric current pulses applied to the sensing circuit -A- through the wire 27 will induce a voltage in the tuned circuits -B- and -C- since the coils 31 and 32 of the tuned circuit -B- and -C- are no longer at right angle to the coil 26 of the drive-sense circuit -A- but at an angle thereto. The momentary magnetic field caused by the impressed current in the coil 26 induces a voltage pulse in the coils 31 and 32 proportional to the sine of the angle of tilt between the coils 26 and 31 and the coils 26 and 32, so that the greater the tilt the higher the voltage and, of course, the angle and direction of flow of the water current. Between the periodic pulses of electric current impressed on the drive-sense circuit -A-, the induced voltages in the circuits -B- and -C- will effect a decaying signal return of amplitude commensurate with amount of tilt. The circuits -B- and -C- are of different resonant frequencies and so can be distinguished, whereby the amount of tilt in each of the North-South and East-West directions can be distinguished and ascertained. FIGS. 7 and 8 reveal the wave form seen on an oscilloscope of the individual decaying voltages effected by the circuits -B- and -C- which are resonating at different frequencies, the amplitude of these wave-forms being determined by the angle or component of tilt in the North or South direction and East or West direction respectively. These two components as vectors when combined will result in the actual direction in the North-South area or East-West area and magnitude or force of the current that effected the tilt of the inclinometer. The photo-sensing devices 23 and 24 are used to discriminate as to which of the two directions the tilt has occured. If the housing 10 and 18 tilt to the north-east, photo sensing device 23 will be viewing the black quadrant 35 and the device 24 will view the white quadrant 34 to send the appropriate signals to indicate same. If the water flow is to the north west, the device 10 will tilt to the north west so that the photo sensing device 24 will view the black quadrant 33 and the device 23 will view the black quadrant 35. If the water flow is to the south east the device 23 will view the black quadrant 35 and the device 24 will view the white quadrant 34, and if the water flow is to the sourth west, the device 23 will view the white quadrant 36 and the device 24 will view the white quadrant 34.

Now, the direction and the force of the current causing the tilt can be ascertained by the apparatus 10, since the drive sensor circuit 26 delivers two signals of different frequencies that are a measure of the amplitude of tilt in the north-south and the east-west directions and the photo sensors 23 and 24 discriminate between north and south and between east and west to permit the determination of the current as to direction and force. FIGS. 7 to 14 inclusive show the wave forms produced by the coils 26 for the particular orientations as indicated on each of the Figures.

As an alternate construction of my inclinometer 11, the use of the photosensing devices 23 and 24 can be omitted as well as the need for dividing the inner sphere 16 into black and white quadrants. In lieu thereof, as shown by FIG. 15, the spherical housing 18 is provided with two sets of coils or windings 41 and 42 lying in a great circle about the sphere 18 at right angle to each other and to the coil 26 of the drive circuit -A-. The coils 41 and 42 are connected by wires 43 and 44 respectively, which wires extend with the wire 27 through the opening 28 in the cover 13 to the aforementioned electronic equipment (not shown) on a boat or on shore. The coil 31 and 41 are in coplanar relation as are the coils 32 and 42 when the spherical housing 18 is in a vertical and neutral position as shown by FIG. 15.

With the spheres 16 and 18 in the positions shown by FIG. 11, upon applying a periodic pulses of electric current to the drive circuit -A-, there will be no voltages induced in the circuits -B- and -C- since their respective coils 31 and 32 are exactly at right angle to the coil 26 of the drive circuit -A-.

Upon the inclinometer 10 being tilted by the force of a current so that the spherical housing 18 rotates in a north or westerly direction voltages will be induced in the tuned circuits -C- and -B- since the coils 32 and 31 will be positioned at an obtuse angle with relation to the drive coil 26. These decaying oscillations of voltages induced by the pulses of current applied to the drive circuit -A- cause a signal to be induced in the sense circuits -X- and -Y- whose wave forms commence with a positive peak as shown by FIGS. 7 and 8. The combined wave form of tilt in the north-west direction as seen on the oscilloscope is shown by FIG. 9.

If the tilt of the inclinometer 10 effected by the current is in the south or easterly direction the wave forms will be as shown by FIGS. 7 and 8 respectively except that the wave forms commence with a negative peak as shown by FIGS. 10 and 11 with FIG. 12 showing the combined wave forms of the tilt of the inclinometer in the south-easterly direction as shown on an oscilloscope. FIG. 13 shows the wave form for the tilt of the inclinometer in the north-east direction, while FIG. 14 shows the wave form for the tilt of the inclinometer in the south-west direction. It can readily be noted that the inclinometer shown by FIG. 15 is capable of indicating the two directions of tilt that, when combined, indicate the precise direction and magnitude of the current being measured by the inclinometer.

What I claim as new and desire to secure by Letters Patent is:

1. Apparatus for sensing the direction and amplitude of tilt of an inclinometer for measuring the force velocity and direction of a current of a body of water movement comprising a cylindrical housing having end caps thereon, a spherical housing contained within said cylindrical housing, said spherical housing attached to an end cap a movable sphere within said spherical housing, a fluid contained within said spherical housing maintaining said sphere in spaced relation to said spherical housing, means for tethering said cylindrical housing in a body of water, a bar magnet mounted within said sphere below the center of gravity of said sphere, the center of gravity of the sphere and the center of gravity of the magnet defining a line which is perpendicular to the magnet for maintaining said sphere in a vertical position and oriented toward the magnetic north pole, the combination comprising a plurality of tuned circuits of different resonant frequencies mounted in great circles about said sphere and at substantially right angles to each other, each of said tuned circuits consisting of a plurality of coil windings connected in series with a capacitor, one of said tuned circuits lying in a common plane with said magnet, a drive coil mounted on said spherical housing at right angles to each of said tuned circuits and lying in a plane substantially parallel to that of said magnet when said cylindrical housing is positioned in an upright position, means for applying an impulse of electric current to said drive coil whereby a voltage impulse is induced in said tuned circuits causing said tuned circuits to oscillate inducing signals in said drive coil that indicate the amount of tilt of said cylindrical housing with relation to said sphere and further means for distinguishing the directions of tilt of said cylindrical housing.

2. The structure as recited by claim 1 wherein said further means comprises a plurality of photosensing devices on said spherical housing and directed toward each other, said photosensing devices being positioned substantially at the intersections of said tuned circuits when said cylindrical housing is in upright position, the surface of said sphere being divided into optically contrasting quadrants, whereby in conjunction with the photosensing devices the direction of the inclination can be ascertained when said cylindrical housing is tilted.

3. The structure as recited in claim 2 wherein said further means comprises a plurality of sense coils mounted on said spherical housing in substantial coplanar relation with said coils of said tuned circuits.

4. The structure as recited in claim 3 wherein said tethering means comprises said cylindrical housing, said spherical housing mounted in said cylindrical housing with the axis of said cylindrical housing passing through the center of said spherical housing, and securing means extending from said cylindrical housing permitting said apparatus to incline in the direction of the water flow and to the degree of inclination caused by the force of the water flow.

* * * * *